US010097092B1

(12) United States Patent
Ho et al.

(10) Patent No.: US 10,097,092 B1
(45) Date of Patent: Oct. 9, 2018

(54) MULTI-PHASE SWITCHING REGULATOR AND CONTROL CIRCUIT AND CONTROL METHOD THEREOF

(71) Applicant: RICHTEK TECHNOLOGY CORPORATION, Zhubei, Hsinchu (TW)

(72) Inventors: Jyun-Che Ho, Chiayi (TW); Yu-Chang Chen, Nantou (TW); Jo-Yu Wang, Hsinchu (TW); Yi-Wei Lee, Taipei (TW); Isaac Y. Chen, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/911,125

(22) Filed: Mar. 4, 2018

(30) Foreign Application Priority Data

Jul. 21, 2017 (TW) .............................. 106124464 A (51) Int. Cl.
H02M 3/158 (2006.01)
(52) U.S. Cl.
CPC .. *H02M 3/1584* (2013.01); *H02M 2003/1586* (2013.01)

(58) Field of Classification Search
CPC ............ G05F 1/563; G05F 1/61; G05F 1/614; H02M 2001/0045; H02M 2001/007; H02M 3/156; H02M 3/158; H02M 3/1588; H02M 2003/1566
See application file for complete search history.

(56) References Cited

U.S. PATENT DOCUMENTS

8,258,769 B2    9/2012    Zambetti et al.
8,643,354 B2    2/2014    Chang et al.

*Primary Examiner* — Adolf Berhane
*Assistant Examiner* — Afework Demisse
(74) *Attorney, Agent, or Firm* — Tung & Associates (57) ABSTRACT

A multi-phase switching regulator includes: a plurality of power stages, a plurality of pulse width modulation (PWM) controllers and a ramp signal setting circuit. The PWM controllers generate corresponding PWM signals for controlling corresponding power stages respectively according to an error signal related to an output voltage and a plurality of ramp signals corresponding to corresponding power stages respectively. The ramp signal setting circuit adjusts the ramp signal of the phase that is to be enabled or disabled according to the phase adjustment signal. Under a phase-cut operation, the ramp signal setting circuit causes a basis level of the ramp signal corresponding to the phase to be disabled to gradually change, thereby decreasing a duty ratio of the PWM signal corresponding to the phase to be disabled.

33 Claims, 8 Drawing Sheets

Phase-cut operation is performed sequentially:
1st-phase PWM controller 11 is turned off first, then 2nd-phase PWM controller 21 is turned off.

Remain active:
3rd-phase

Fig. 8

Phase-add operation is performed sequentially:
2nd-phase PWM controller 21 is resumed first, then 1st-phase PWM controller 11 is resumed.

Active phase: 3rd-phase

Fig. 9

Phase-cut operation is performed sequentially:
1st-phase PWM controller 11 is turned off first, then 2nd-phase PWM controller 21 is turned off.

Fig. 10

Phase-add operation is performed sequentially:
2nd-phase PWM controller 21 is resumed first, then 1st-phase PWM controller 11 is resumed.

MULTI-PHASE SWITCHING REGULATOR AND CONTROL CIRCUIT AND CONTROL METHOD THEREOF

CROSS REFERENCE

The present invention claims priority to TW 106124464 filed on Jul. 21, 2017.

BACKGROUND OF THE INVENTION

Field of Invention

The present invention relates to a multi-phase switching regulator and a control circuit and a control method thereof; particularly, it relates to such multi-phase switching regulator, control circuit and control method which can avoid an undesirable undershoot or overshoot of the output voltage during a transition period of "phase add" or "phase cut" operation.

Description of Related Art

Figure 1:
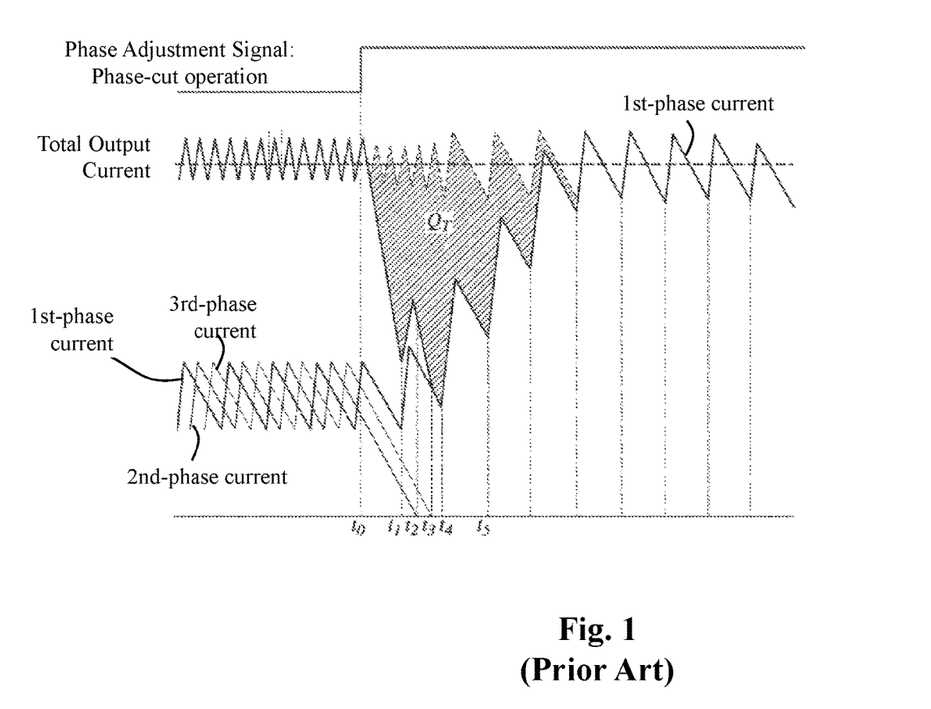
FIG. 1 shows a wave form of a conventional multi-phase switching regulator wherein it is under a phase-cut operation.

Please refer to FIG. 1, which shows a wave form of a conventional multi-phase switching regulator when it is under a phase adjustment operation.

A multi-phase switching regulator is controlled to adapt the number of active phases to the load conditions, by reducing or increasing the number of phases depending on the current required by the load. For example, the number of phases is reduced (i.e. "phase cut") at a light load condition, the number of phases is increased (i.e. "phase add") at a heavy load condition. However, an undesirable transient voltage undershoot or overshoot is a problem in the conventional multi-phase switching regulator when its phase number is being adjusted, i.e. when it is in "phase add" or "phase cut" operation. Please refer to FIG. 1 which illustrates an exemplary transition from three active phases to one active phase. As shown in FIG. 1, when a phase adjustment signal instructs to reduce the number of active phases to 1 (at the time point t0), the 2nd-phase power stage and the 3rd-phase power stage are turned off immediately; thus, the 2nd-phase current and 3rd-phase current drop to zero (at the time points t2 and t3, respectively), and the 1st-phase power stage is the sole source left to supply current (i.e., the 1st-phase current). As shown in FIG. 1, this will result in a sudden drop of the total output current Iout, thereby causing an undesirable undershoot of the output voltage during the transition; the insufficient amount of the output voltage is equal to the area QT. The sudden drop (i.e., undershoot) of the output voltage causes instability of the multi-phase switching regulator and other problems.

On the other hand, when the conventional multi-phase switching regulator is under a "phase add" operation, a similar problem also arises during the transitions period.

For relevant details related to the present invention, one can refer to U.S. Pat. No. 8,258,769B2 and U.S. Pat. No. 8,643,354B2.

In view of the above, to overcome the drawbacks in the prior art, the present invention propose a multi-phase switching regulator, and a control circuit and a control method thereof, which can avoid an undesirable undershoot or overshoot of the output voltage during a transition period of "phase add" or "phase cut" operation.

SUMMARY OF THE INVENTION

From one perspective, the present invention provides a multi-phase switching regulator, comprising: a plurality of power stages configured to operably convert an input voltage to an output voltage, wherein each power stage is one phase; wherein at least one of the power stages is configured to be enabled (phase-add) or disabled (phase-cut) according to a phase adjustment signal; and, wherein each power stage controls at least one power transistor in the corresponding power stage according to a corresponding pulse width modulation (PWM) signal, so that the plurality of power stages together convert the input voltage to the output voltage, while each phase generates a respective phase output current; a plurality of PWM controllers, which are configured to operably generate the PWM signals for controlling the corresponding power stages according to an error signal which is related to an output voltage and a plurality of ramp signals corresponding to the plurality of PWM controller; and a ramp signal setting circuit, which is configured to operably adjust the ramp signal of the phase that is to be enabled or disabled according to the phase adjustment signal; wherein, under a phase-cut operation, the ramp signal setting circuit causes the ramp signal of the phase that is to be disabled to gradually change, such that a duty ratio of the PWM signal of the phase that is to be disabled gradually decreases.

From another perspective, the present invention provides a control circuit of a multi-phase switching regulator, the multi-phase switching regulator comprising: a plurality of power stages configured to operably convert an input voltage to an output voltage, wherein each power stage is one phase; wherein at least one of the power stages is configured to be enabled (phase-add) or disabled (phase-cut) according to a phase adjustment signal; and, wherein each power stage controls at least one power transistor in the corresponding power stage according to a corresponding pulse width modulation (PWM) signal, so that the plurality of power stages together convert the input voltage to the output voltage, while each phase generates a respective phase output current; the control circuit comprising: a plurality of PWM controllers, which are configured to operably generate the PWM signals for controlling the corresponding power stages according to an error signal which is related to an output voltage and a plurality of ramp signals corresponding to the plurality of PWM controller; and a ramp signal setting circuit, which is configured to operably adjust the ramp signal of the phase that is to be enabled or disabled according to the phase adjustment signal; wherein, under a phase-cut operation, the ramp signal setting circuit causes the ramp signal of the phase that is to be disabled to gradually change, such that a duty ratio of the PWM signal of the phase that is to be disabled gradually decreases.

In one embodiment, under a phase-cut operation in which two or more phases are cut, the phases to be disabled are turned OFF sequentially and are not turned OFF at the same time.

In one embodiment, under a phase-cut operation in which two or more phases are cut, the ramp signal corresponding to one phase to be disabled is first caused to gradually change, and thereafter, the ramp signal corresponding to another phase to be disabled is caused to gradually change.

In one embodiment, the ramp signal setting circuit includes: an adjustable offset voltage source, which is configured to operably adjust an offset thereof according to the phase adjustment signal; and an adder circuit, which is configured to add the offset onto an initial ramp signal corresponding to the phase to be enabled or disabled, so as to generate the ramp signal corresponding to the phase to be enabled or disabled, whereby a basis level of the ramp signal is changed.

In one embodiment, the initial ramp signal corresponding to each phase is generated based upon a clock circuit or the corresponding phase output current.

In one embodiment, under a phase-cut operation, in at least one of the power stages that is not to be disabled, a basis level of the ramp signal remains unchanged or is caused to gradually decrease with a constant or variable slope.

In one embodiment, under a phase-add operation, the ramp signal setting circuit causes the ramp signal of the phase to be enabled to gradually change, such that a duty ratio of the PWM signal of the phase to be enabled gradually increases.

In one embodiment, under a phase-add operation in which two or more phases are added, the ramp signal corresponding to one phase to be enabled is first caused to gradually change, and thereafter, the ramp signal corresponding to another phase to be enabled is caused to gradually change.

In one embodiment, when it is under a phase-add operation, in at least one of the power stages that is already active, a basis level of the ramp signal remains unchanged or is caused to gradually increase with a constant or variable slope.

In one embodiment, a slope of a basis level of the ramp signal corresponding to the phase to be disabled is adjustable.

In one embodiment, a slope of a basis level of the ramp signal corresponding to the phase to be enabled is adjustable.

From still another perspective, the present invention provides a control method of a multi-phase switching regulator, wherein the multi-phase switching regulator comprises: a plurality of power stages configured to operably convert an input voltage to an output voltage, wherein each power stage is one phase; wherein at least one of the power stages is configured to be enabled (phase-add) or disabled (phase-cut) according to a phase adjustment signal; and, wherein each power stage controls at least one power transistor in the corresponding power stage according to a corresponding pulse width modulation (PWM) signal, so that the plurality of power stages together convert the input voltage to the output voltage, while each phase generates a respective phase output current; the control method comprising: generating the PWM signals according to an error signal which is related to an output voltage and a plurality of ramp signals corresponding to the plurality of power stages respectively; and adjusting the ramp signal of the phase that is to be enabled or disabled according to the phase adjustment signal; wherein, under a phase-cut operation, the ramp signal of the phase to be disabled is caused to gradually change, such that a duty ratio of the PWM signal of the phase to be disabled gradually decreases.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the apparatus and the devices, but not drawn according to actual scale.

The fundamental spirit of the present invention lies in that: when it is required to reduce or increase the number of active phases of the power stages of a multi-phase switching regulator, such as under a transition between a light load condition and a heavy load condition, the multi-phase switching regulator of the present invention is capable of adjusting a ramp signal which is related to a phase to be enabled or disabled according to the phase adjustment signal.

That is, on one hand, when the multi-phase switching regulator is under a phase-cut operation, a ramp signal setting circuit is configured to operably cause the ramp signal corresponding to the phase to be disabled to gradually change, thereby decreasing a duty ratio of the PWM signal corresponding to the phase to be disabled. On the other hand, when the multi-phase switching regulator is under a phase-add operation, the ramp signal setting circuit is configured to operably cause the ramp signal corresponding to the phase to be enabled to gradually change, thereby increasing a duty ratio of the PWM signal corresponding to the phase to be enabled. Accordingly, the multi-phase switching regulator of the present invention can avoid or at least reduce an undesirable undershoot or overshoot of the output voltage during the transient period. In one embodiment, "causing the ramp signal corresponding to the phase to be disabled/phase to gradually change" can be implemented by, for example but not limited to, causing a basis level of the ramp signal to change; or in another embodiment, causing a slope of the ramp signal to change.

Figure 2:
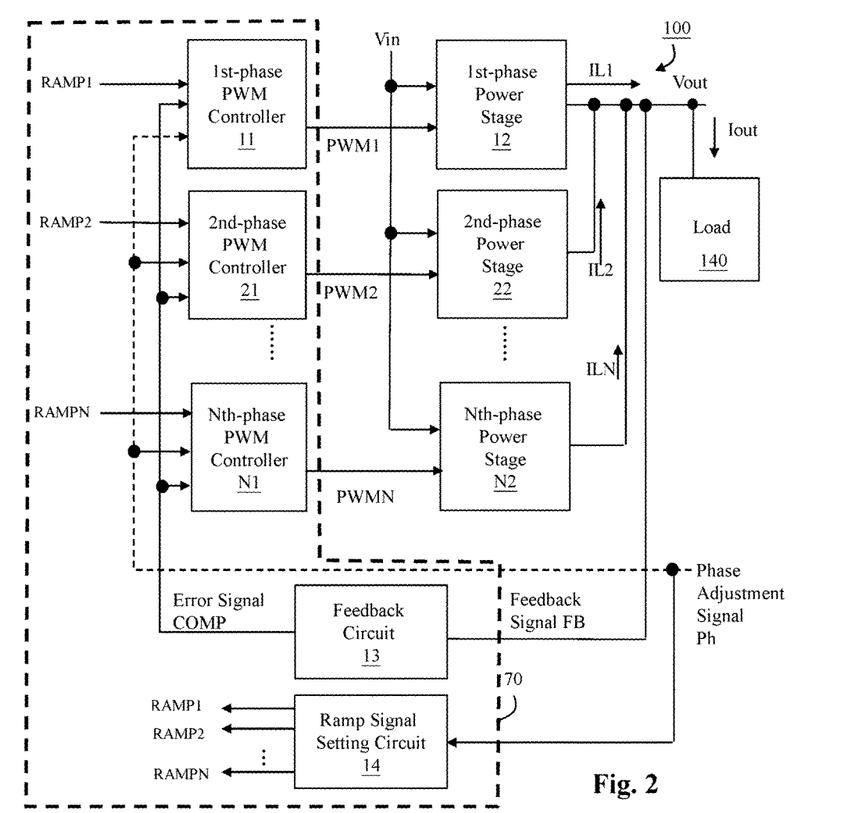
FIG. 2 shows a schematic block diagram of a multi-phase switching regulator according to an embodiment of the present invention.
Figure 3A:
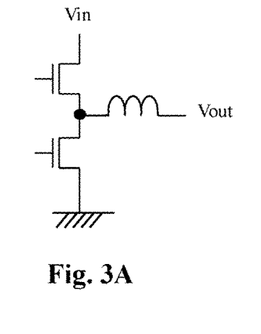
FIGS. 3A-3J show synchronous and asynchronous buck, boost, inverting, buck-boost and inverting-boost power stage circuits, respectively.
Figure 3B:
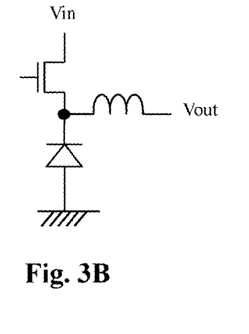
Figure 3C:
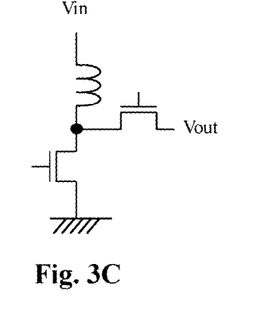
Figure 3D:
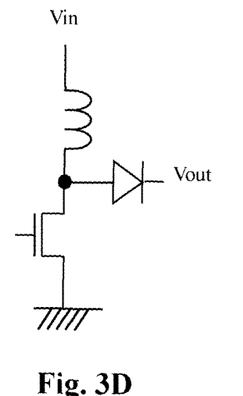
Figure 3E:
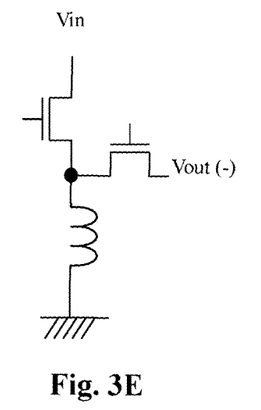
Figure 3F:
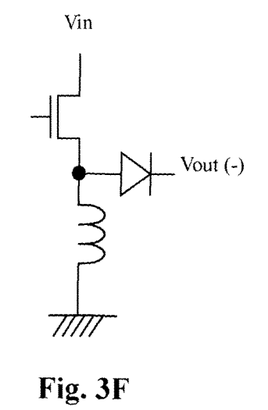
Figure 3G:
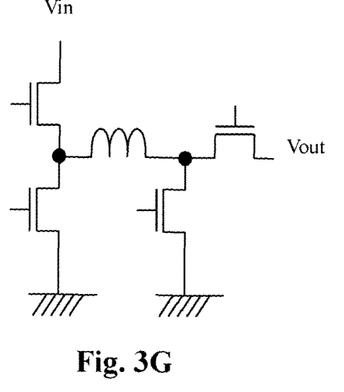
Figure 3H:
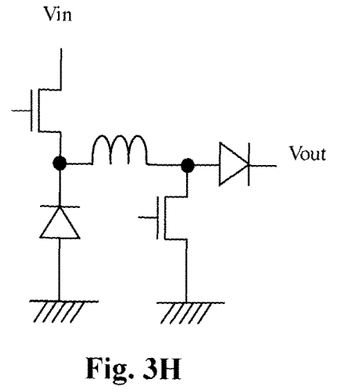
Figure 3I:
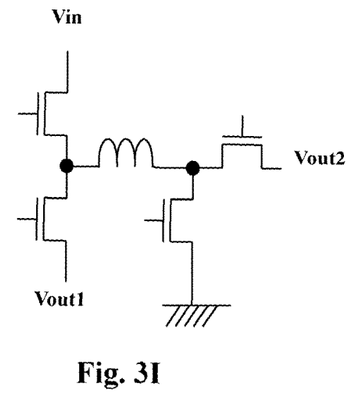
Figure 3J:
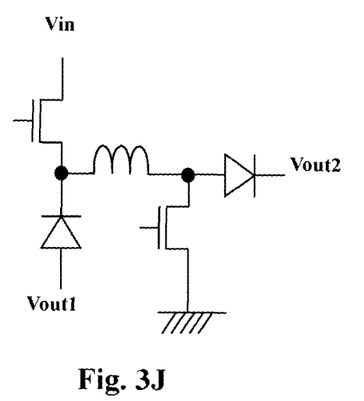

Please refer to FIG. 2 and FIGS. 3A-3J. FIG. 2 shows a schematic block diagram of a multi-phase switching regulator according to an embodiment of the present invention. FIGS. 3A-3J show synchronous and asynchronous buck, boost, inverting, buck-boost and inverting-boost power stage circuits, respectively.

As shown in FIG. 2, the multi-phase switching regulator 100 of this embodiment comprises: plural power stages 12, and N2, plural PWM controllers 11, 21, . . . and N1, a feedback circuit 13 and a ramp signal setting circuit 14. Each of the power stages 12, and N2 is one phase and all of them together convert an input voltage Vin to an output voltage Vout. Each of the power stages 12, 22, . . . and N2 (namely, a 1st-phase power stage 12, a 2nd-phase power stage and an Nth-phase power stage N2) can be, for example but not limited to, a synchronous or asynchronous buck, boost, inverting, buck-boost or inverting-boost power stage circuit shown in anyone of FIGS. 3A-3J. Each power stage 12, 22, . . . or N2 controls at least one power transistor therein (as shown in FIGS. 3A-3J) according to corresponding pulse width modulation (PWM) signal PWM1, PWM2, . . . or PWMN, so as to together convert the input voltage Vin to the output voltage Vout. Each respective phase can generate corresponding phase output current IL1, IL2, . . . or ILN. When it is required to adjust the number of active phases, a phase adjustment signal Ph will cause at least one of the power stages to transit from an active phase to an inactive phase (i.e. to be disabled, or "phase-cut") or transit from an inactive phase to an active phase (i.e. to be enabled, or "phase-add").

For simplicity in explaining the spirit of the invention, let us assume that the 1st-phase power stage 12 is the power stage that is under adjustment to be enabled or disabled during a phase adjustment operation. However, certainly, any other power stage can be the power stage that is under adjustment to be enabled or disabled during a phase adjustment operation. Or, the power stage that is under adjustment to be enabled or disabled can be in an alternating order, e.g., enabled or disabled in turn, during a phase adjustment operation.

As shown in FIG. 2, each PWM controller 11, or N1 can generate corresponding PWM signal WM1, PWM2, . . . or PWMN for controlling corresponding power stage 12, 22, . . . or N2, so as to together convert the input voltage Vin to the output voltage Vout.

The feedback circuit 13 generates an error signal COMP according to a feedback signal FB which is related to an output voltage Vout. The error signal COMP is inputted into each PWM controller 11, 21, . . . or N1.

The present invention is different from and is superior than the prior art in that: the present invention includes a ramp signal setting circuit 14, and the ramp signal setting circuit 14 is capable of adjusting the ramp signals RAMP1, RAMP2, . . . and RAMPN of the phases to be enabled or disabled according to the phase adjustment signal Ph; as such, the undesirable overshoot or undershoot of the output voltage during the transient transition period of phase-add operation or phase-cut operation is avoided.

Figure 4:
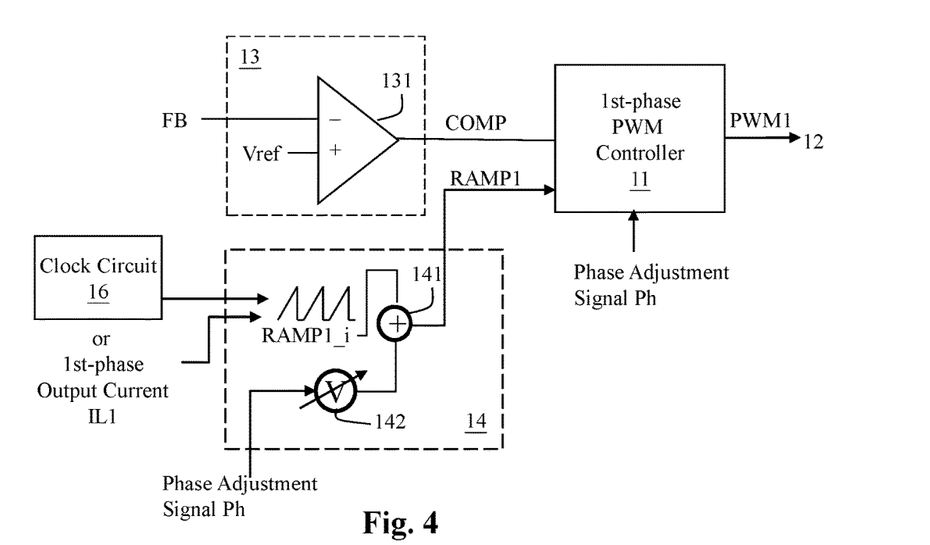
FIG. 4 shows an embodiment illustrating how each PWM controller generates respective PWM signal.

Please refer to FIG. 4, which shows an embodiment illustrating how each PWM controller generates respective corresponding PWM signal. As described above, for simplicity in explaining the spirit of the invention, in the exemplary illustration of FIG. 4, we assume that the 1st-phase power stage 12 is the power stage that is under adjustment during a phase adjustment operation, and the 1st-phase power stage 12 is controlled by a corresponding PWM signal PWM1 which is generated by a corresponding 1st-phase PWM controller 11. However, certainly, any other power stage can be the power stage that is under adjustment to be enabled or disabled during a phase adjustment operation. Or, the power stage that is under adjustment to be enabled or disabled can be in an alternating order, e.g., enabled or disabled in turn, during a phase adjustment operation.

As shown in FIG. 4, in one embodiment, the feedback circuit 13 includes an error amplifier 131. This error amplifier 131 compares the feedback signal FB with a reference signal Vref, to generate the error signal COMP. The obtained error signal COMP is inputted into the 1st-phase PWM controller 11.

In one embodiment, the ramp signal setting circuit 14 includes: an adjustable offset voltage source 142 and an adder circuit 141. The adjustable offset voltage source 142 is configured to operably adjust an offset thereof according to the phase adjustment signal Ph. The adjustment of the offset will cause the basis level of the ramp signal to change, which will be described in more detail later.

Figure 6:
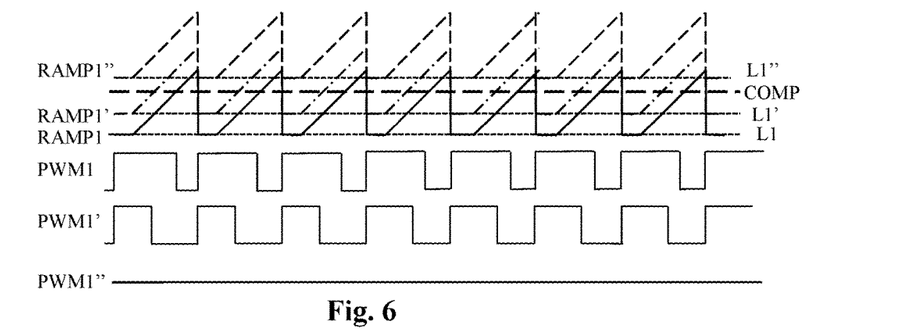
FIG. 6 shows, under a voltage-mode operation, wave forms of PWM signals and corresponding ramp signals of a PWM controller according to an embodiment of the present invention.
Figure 7:
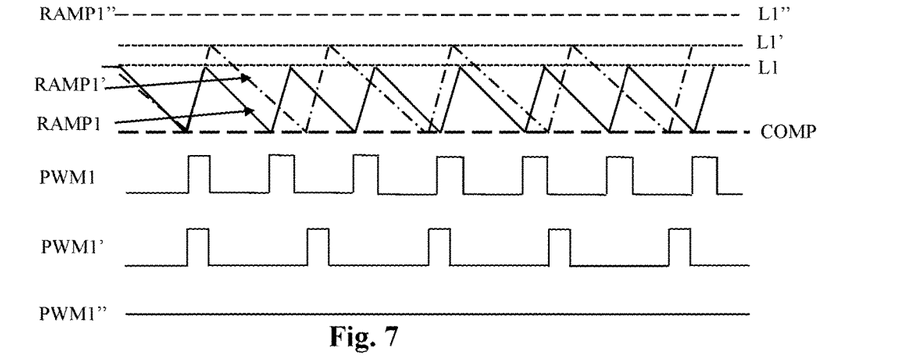
FIG. 7 shows, under a constant ON time operation, wave forms of PWM signals and corresponding ramp signals of a PWM controller according to an embodiment of the present invention.

In the embodiment shown in the figure, the initial ramp signal RAMP_i can be a ramp signal generated via any means. In one embodiment, if the multi-phase switching regulator 100 operates under voltage-mode, the initial ramp signal RAMP_i can be generated according to, for example but not limited to, a clock signal CLK generated via a clock circuit 16. In another embodiment, if the multi-phase switching regulator 100 operates under current-mode, the initial ramp signal RAMP_i can be generated according to, for example but not limited to, the phase output current corresponding to the phase. The phase output current can be obtained by sensing, for example but not limited to, the current through the inductor in the power stage (referring to FIGS. 3A-3J). Note that, in the exemplary illustration of FIG. 4, both the clock circuit 16 and the 1st-phase output current IL1 are shown, but only one of them is required to generate the initial ramp signal RAMP_i The adder circuit 141 of the ramp signal setting circuit 14 is configured to add an offset generated from the adjustable offset voltage source 142 onto the initial ramp signal RAMP_i of the phase to be enabled or disabled, to generate the ramp signal RAMP1 corresponding to the phase to be enabled or disabled, whereby a basis level L1 of the ramp signal RAMP1 is adjusted (FIGS. 6-7 show that the basis level L1 of the ramp signal RAMP1 is adjusted). Importantly, in the present invention, because the ramp signal RAMP1 generated by the ramp signal setting circuit 14 has an adjustable basis level L1, the undesirable undershoot or overshoot of the output voltage during the transient transition period of "phase add" or "phase cut" operation is avoided. Relevant details as to how the undershoot or overshoot is avoided will be described in more detail later.

Figure 5A:
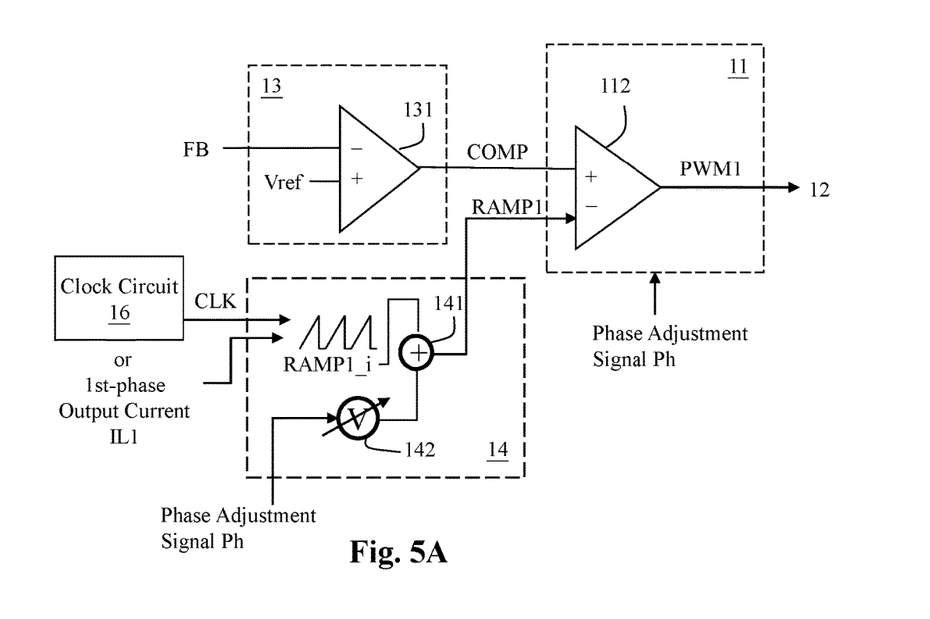
FIG. 5A shows an embodiment illustrating how each PWM controller, under a current-mode operation or a voltage-mode operation, generates respective PWM signal.

Please refer to FIG. 5A, which shows an embodiment illustrating how each PWM controller, under a current-mode operation or a voltage-mode operation, generates respective corresponding PWM signal. In this embodiment, the 1st-phase PWM controller 11 can include, for example but not limited to, a comparison circuit 112. The comparison circuit 112 of the 1st-phase PWM controller 11 compares the error signal COMP with the ramp signal RAMP1, to generate the PWM signal PWM1, and the PWM signal PWM1 is then inputted into the 1st-phase power stage 12. In this embodiment, for example, the PWM signal has a constant frequency and the duty ratio of the PWM signal is adjustable.

Figure 5B:
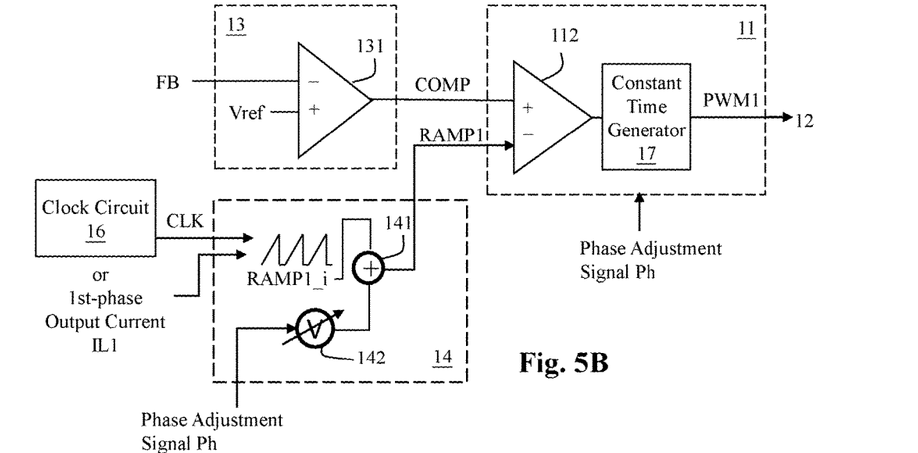
FIG. 5B shows an embodiment illustrating how each PWM controller, under a constant ON time operation, generates respective PWM signal.

Please refer to FIG. 5B, which shows an embodiment illustrating how each PWM controller, under a constant time operation, generates respective corresponding PWM signal. The embodiment shown in FIG. 5B is different from the embodiment shown in FIG. 5A, in that: the 1st-phase PWM controller 11 in FIG. 5B can include, for example but not limited to, a comparison circuit 112 and an ON time generator 17. After the comparison circuit 112 compares the error signal COMP with the ramp signal RAMP1 to generate a comparison result, the ON time generator 17 generates a constant time based upon the comparison result from the comparison circuit 112. The "constant time" can be a constant ON time or a constant OFF time. In this embodiment, for example, the PWM signal has a variable frequency and the duty ratio of the PWM signal is adjustable Optionally (but not necessarily), in the embodiments shown in FIG. 4, FIG. 5A and FIG. 5B, the 1st-phase PWM controller 11 can be instantly fully enabled or disabled according to the phase adjustment signal Ph whenever it is necessary to do so.

Figure 8:
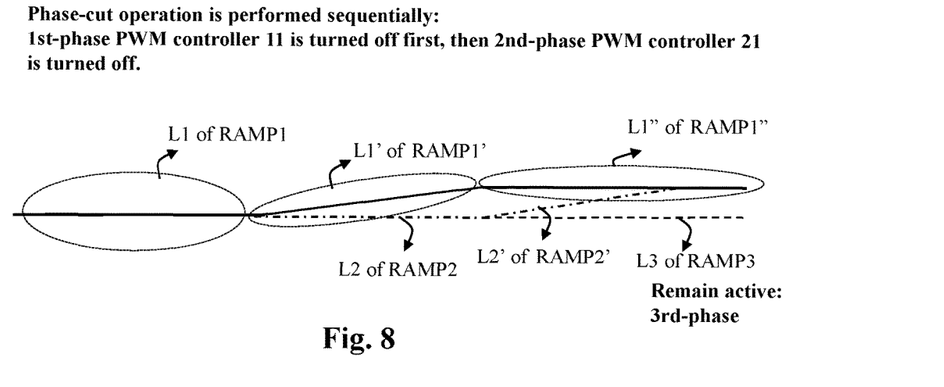
FIG. 8 shows an embodiment illustrating how the present invention, under a voltage-mode operation and under a phase-cut operation in which two phases are disabled, sequentially causes basis levels of respective different ramp signals corresponding to respective different disabled phases to gradually change, thereby decreasing duty ratios of respective different PWM signals corresponding to respective different disabled phases.

Please refer to FIG. 5A in conjugation with FIG. 6 and FIG. 8. FIG. 6 shows, under a voltage-mode operation, wave forms of PWM signals and corresponding ramp signals of a PWM controller according to an embodiment of the present invention.

FIG. 8 shows an embodiment illustrating how the present invention, under a voltage-mode operation and under a phase-cut operation in which two phases are disabled, sequentially causes basis levels of respective different ramp signals corresponding to respective different disabled phases to gradually change, thereby decreasing duty ratios of respective different PWM signals corresponding to respective different disabled phases.

To explain how the ramp signal setting circuit 14 changes the basis level L1 of the ramp signal RAMP1 corresponding to the phase to be disabled, FIG. 5A, FIG. 6 and FIG. 8 illustrate an exemplary phase-cut operation, wherein FIG. 6 shows wave forms of PWM signals (PWM1, PWM1' and PWM1") generated by 1st-phase PWM controller 11 and corresponding ramp signals (RAMP1, RAMP1' and RAMP1").

Referring to FIG. 6, the present invention is superior than the prior art in that: the ramp signal setting circuit 14 of the present invention can cause the basis level L1 of the ramp signal RAMP1 corresponding to the phase to be enabled or disabled to gradually change. To be more specific, when the multi-phase switching regulator 100 is under a phase-cut operation, the ramp signal setting circuit 14 can cause the basis level L1 of the ramp signal RAMP1 corresponding to the phase to be disabled to gradually increase. Namely, the basis level of the ramp signal changes from L1 to L1', and from L1' to L1". Consequently, the duty ratio of the PWM signal corresponding to the phase to be disabled gradually decreases; that is, the PWM signal changes from PWM1 to PWM1', and from PWM1' to PWM1". It is noteworthy that, in this embodiment, the phase to be disabled is not disabled instantly, but its duty ratio gradually decreases, until the phase to be disabled becomes fully inactive. Thus, the undershoot or overshoot problem is solved. It should be explained that, FIG. 6 and FIG. 8 show that the basis level of the ramp signal and the duty ratio of the PWM signal change by three-step transition, but this is for illustrative purpose for explaining the progress of gradual change, not for limiting the scope of the present invention. Certainly, in another embodiment, it is also practicable and within the scope of the present invention that the basis level of the ramp signal and the duty ratio of the PWM signal can change by two-step transition or more than three steps or by continuous transition.

In brief, when it is determined to start a phase-cut operation, in the first one phase to be cut, the basis level L1 of the ramp signal RAMP' will gradually rise up to the basis level L1' with a slope, until the basis level L1" (referring to FIG. 8).

Please still refer to FIG. 8. In one embodiment according to the present invention, if two or more phases are to be cut, preferably, the phases to be disabled are turned OFF sequentially and not turned OFF at the same time.

More specifically, when it is under a phase-cut operation in which two or more phases are to be cut, according to the present invention, the ramp signal RAMP1 of one of the phases to be disabled (e.g., the 1st-phase power stage 12) can be first turned off. Thus, the basis level L1 of the ramp signal RAMP1 corresponding to the 1st-phase power stage 12 will gradually rise up with a slope (e.g., to become the basis level L1' and the basis level L1"), whereby the 1st-phase power stage 12 is gradually turned off to become inactive. Next, another phase (e.g., the 2nd-phase power stage 22) is gradually turned OF and so on.

In the exemplary illustration of FIG. 8, the 3rd-phase remains active, wherein the basis level L3 of the ramp signal RAMP3 corresponding to this active phase (i.e., the 3rd-phase) is unchanged (as shown in FIG. 8). However when it is necessary to turn off the 3rd-phase, the basis level L3 of the ramp signal RAMP3 corresponding to the 3rd-phase also can rise with a slope.

Figure 10:
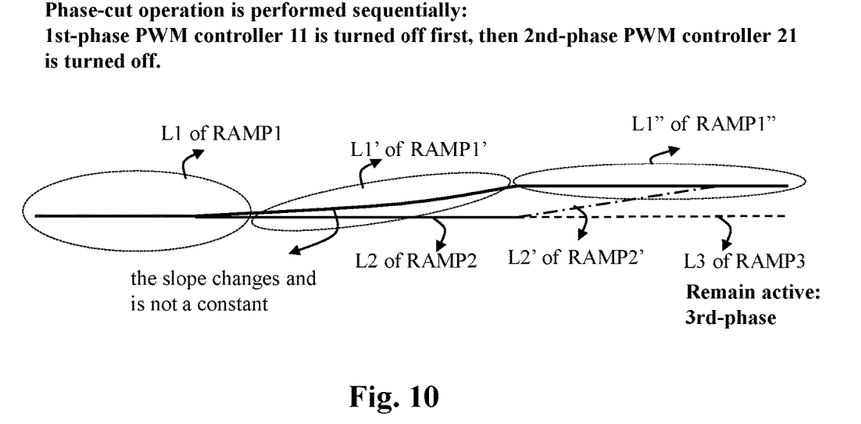
FIG. 10 shows an embodiment illustrating how the present invention, under a voltage-mode operation and under a phase-cut operation in which two phases are disabled, sequentially causes basis levels of respective different ramp signals corresponding to respective different disabled phases to gradually change, thereby decreasing duty ratios of respective different PWM signals corresponding to respective different disabled phases, wherein a slope of the basis level of one or more ramp signal is adjustable.

Please refer to FIG. 8 in conjugation with FIG. 10. FIG. 10 shows another embodiment of the present invention. Differently from the embodiment of FIG. 8, in the embodiment of FIG. 10, the slope of the basis level L1' of the ramp signal RAMP1' is variable instead of constant (and therefore the basis level L1' of the ramp signal RAMP1' is illustrated as a curve instead of a straight line in FIG. 10). Note that, in the exemplary illustration of FIG. 10, the basis level L2' of the ramp signal RAMP2' is illustrated as a straight line; this is to illustrate that different phases can be arranged differently. However, it is also practicable and within the scope of the present invention that the basis level L2' of the ramp signal RAMP2' can be a curve or a step shape or any other form.

Figure 9:
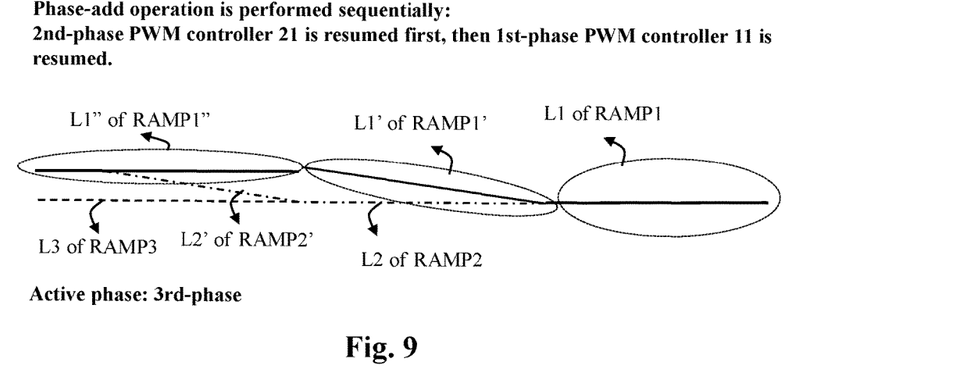
FIG. 9 shows an embodiment illustrating how the present invention, under a voltage-mode operation and under a phase-add operation in which two phases are enabled, sequentially causes basis levels of respective different ramp signals corresponding to respective different enabled phases to gradually change, thereby increasing duty ratios of respective different PWM signals corresponding to respective different enabled phases.

Please refer to FIG. 5A in conjugation with FIG. 6 and FIG. 9. FIG. 9 shows an embodiment illustrating how the present invention, under a voltage-mode operation and under a phase-add operation in which two phases are enabled, sequentially causes basis levels of respective different ramp signals corresponding to respective different enabled phases to gradually change, thereby increasing duty ratios of respective different PWM signals corresponding to respective different enabled phases.

An exemplary phase-add operation is explained with reference to FIG. 5A, FIG. 6 and FIG. 9.

Please refer to FIG. 6. When it is under a phase-add operation, the ramp signal setting circuit 14 of the present invention can cause the basis level L1" of the ramp signal RAMP1" corresponding to the phase to be enabled to gradually change, thereby gradually increasing a duty ratio of the PWM signal corresponding to the phase to be enabled. Namely, the basis level of the ramp signal changes from L1" to L1', and from L1' to L1. Consequently, the duty ratio of the PWM signal corresponding to the phase to be enabled gradually increase; that is, the PWM signal changes from PWM1" to PWM1', and from PWM1' to PWM1.

In one embodiment, the basis level of the ramp signal is arranged to gradually change only under one of the phase-cut operation and the phase-add operation (that is, the gradual change of the basis level of the ramp signal occurs only in the phase-cut operation but does not occur in the phase-add operation; or, the gradual change of the basis level of the ramp signal occurs only in the phase-add operation but does not occur in the phase-cut operation). In another embodiment, the gradual change of the basis level of the ramp signal occurs in both the phase-cut operation and the phase-add operation.

As shown in FIG. 9, when it is under a phase-add operation in which two or more phases are added, according to the present invention, the phases to be enabled can be enabled to become active sequentially, and are not enabled to become active at the same time. As shown in FIG. 9, the 2nd-phase is first enabled to become active, and next, the 1st-phase is enabled to become active. Note that the basis level of the ramp signal of the enabled phase gradually decreases, and, consequently, the duty ratio of the PWM signal corresponding to the enabled phase gradually increases. The basis level of the ramp signal of the phase that is already active and remains active (the 3rd-phase in this case) can remain unchanged or gradually increase.

Figure 11:
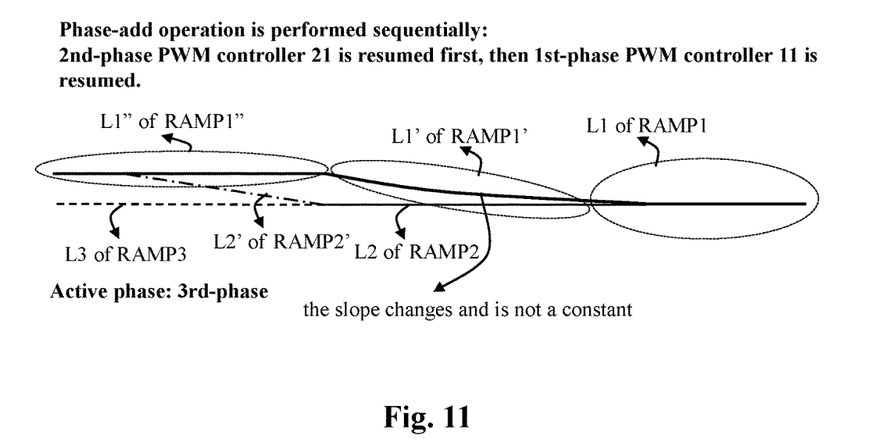
FIG. 11 shows an embodiment illustrating how the present invention, under a voltage-mode operation and under a phase-add operation in which two phases are enabled, sequentially causes basis levels of respective different ramp signals corresponding to respective different enabled phases to gradually change, thereby increasing duty ratios of respective different PWM signals corresponding to respective different enabled phases, wherein a slope of the basis level of one or more ramp signal is adjustable.

Please refer to FIG. 9 in conjugation with FIG. 11. FIG. 11 shows another embodiment of the present invention. Differently from the embodiment of FIG. 9, in the embodiment of FIG. 11, the slope of the basis level L1' of the ramp signal RAMP1' is variable instead of constant (and therefore the basis level L1' of the ramp signal RAMP1' is illustrated as a curve instead of a straight line in FIG. 11). Note that, in the exemplary illustration of FIG. 11, the basis level L2' of the ramp signal RAMP2' is illustrated as a straight line; this is to illustrate that different phases can be arranged differently. However, it is also practicable and within the scope of the present invention that the basis level L2' of the ramp signal RAMP2' can be a curve or a step shape or any other form.

Please refer to FIG. 5B in conjugation with FIG. 7 and FIG. 8. FIG. 7 under a constant ON time operation, wave forms of PWM signals and corresponding ramp signals of a PWM controller according to an embodiment of the present invention. FIG. 8 shows an embodiment illustrating how the present invention, under a voltage-mode operation and under a phase-cut operation in which two phases are disabled, sequentially causes basis levels of respective different ramp signals corresponding to respective different disabled phases to gradually change, thereby decreasing duty ratios of respective different PWM signals corresponding to respective different disabled phases.

FIG. 5B, FIG. 7 and FIG. 8 illustrate an exemplary phase-cut operation with constant ON time control scheme, wherein FIG. 7 shows wave forms of PWM signals (PWM1, PWM1' and PWM1") generated by 1st-phase PWM controller 11 and corresponding ramp signals (RAMP1, RAMP1' and RAMP1"). By similar principle, the present invention also can be applied to a constant OFF time control scheme.

For simplicity, in the exemplary illustration of FIG. 7, only the wave forms of PWM signals and ramp signals corresponding to the 1st-phase PWM controller 11 are shown.

Please refer to FIG. 7. Because the basis level of the ramp signal gradually changes, the constant ON time generator is triggered at different time points, whereby the frequency of the PWM signal changes. Although the ON time is a constant (or, in another embodiment, the OFF time is a constant), because the frequency changes, the duty ratio of the PWM signal changes accordingly. Similar to the previous embodiments, under a phase-cut operation, the duty ratio of the PWM signal corresponding to the phase to be disabled will be gradually decreased, while under a phase-add operation, the duty ratio of the PWM signal corresponding to the phase to be enabled will be gradually increased.

It is noteworthy that: in all the above-mentioned embodiments, the direction of the gradual change (i.e., gradual increasing or gradual decreasing) will become opposite to what has been described, if the meanings of the high and low levels of the digital signals are interchanged, or if an opposite type of power transistor switch is used (e.g., the mechanism for controlling an NMOS power transistor switch is different from controlling a PMOS power transistor switch). The spirit of the present invention should cover all such different modifications and variations.

Figure 12:
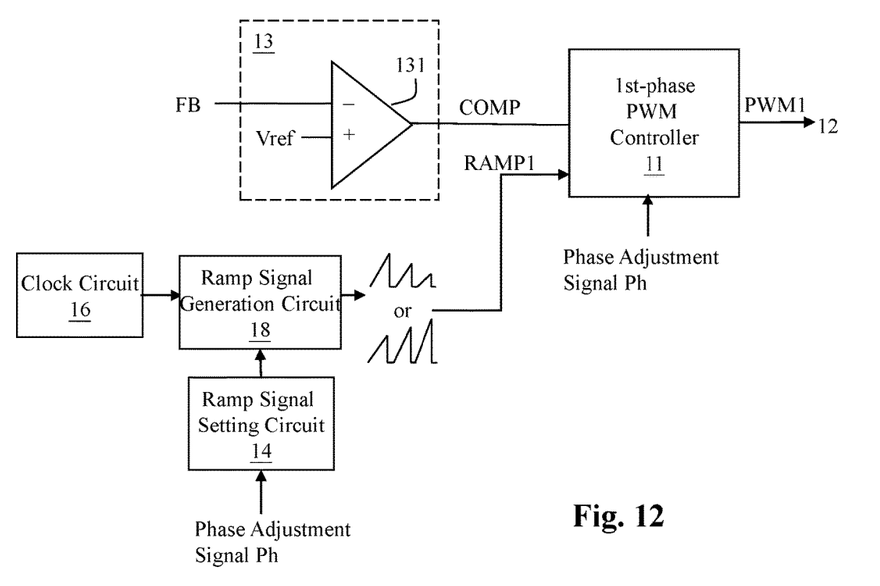
FIG. 12 shows another embodiment illustrating how the present invention causes a basis level of a ramp signal to gradually change.

Besides, "causing a basis level of the ramp signal to change" should be interpreted as covering its equivalents and it is not limited to adding a basis level onto an initial ramp signal; in fact, there does not necessarily have to be a basis level. For example, changing a slope of an initial ramp signal should be viewed as an equivalent of the present invention, which can also achieve the objectives or advantages of the present invention. Please refer to FIG. 12. In the embodiment of FIG. 12, the slope of an initial ramp signal generated by a ramp signal generation circuit 18 is adjusted according to the phase adjustment signal Ph, which also can affect the result of gradually decreasing or gradually increasing the duty ratio of the PWM signal.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the positive and negative input terminals of an error amplifier circuit or a comparator are interchangeable, with corresponding amendments of the circuits processing these signals. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A multi-phase switching regulator, comprising:
   a plurality of power stages configured to operably convert an input voltage to an output voltage, wherein each power stage is one phase; wherein at least one of the power stages is configured to be enabled (phase-add) or disabled (phase-cut) according to a phase adjustment signal; and, wherein each power stage controls at least one power transistor in the corresponding power stage according to a corresponding pulse width modulation (PWM) signal, so that the plurality of power stages together convert the input voltage to the output voltage, while each phase generates a respective phase output current;
   a plurality of PWM controllers, which are configured to operably generate the PWM signals for controlling the corresponding power stages according to an error signal which is related to an output voltage and a plurality of ramp signals corresponding to the plurality of PWM controller; and
   a ramp signal setting circuit, which is configured to operably adjust the ramp signal of the phase that is to be enabled or disabled according to the phase adjustment signal; wherein, under a phase-cut operation, the ramp signal setting circuit causes the ramp signal of the phase to be disabled to gradually change, such that a duty ratio of the PWM signal of the phase to be disabled gradually decreases.

2. The multi-phase switching regulator of claim 1, wherein under a phase-cut operation in which two or more phases are cut, the phases to be disabled are turned OFF sequentially and are not turned OFF at the same time.

3. The multi-phase switching regulator of claim 2, wherein under a phase-cut operation in which two or more phases are cut, the ramp signal corresponding to one phase to be disabled is first caused to gradually change, and thereafter, the ramp signal corresponding to another phase to be disabled is caused to gradually change.

4. The multi-phase switching regulator of claim 1, wherein the ramp signal setting circuit includes:
   an adjustable offset voltage source, which is configured to operably adjust an offset thereof according to the phase adjustment signal; and
   an adder circuit, which is configured to add the offset onto an initial ramp signal corresponding to the phase to be enabled or disabled, so as to generate the ramp signal corresponding to the phase to be enabled or disabled, whereby a basis level of the ramp signal is changed.

5. The multi-phase switching regulator of claim 4, wherein the initial ramp signal corresponding to each phase is generated based upon a clock circuit or the corresponding phase output current.

6. The multi-phase switching regulator of claim 1, wherein when it is under a phase-cut operation, in at least one of the power stages that is not to be disabled, a basis level of the ramp signal remains unchanged or is caused to gradually decrease with a constant or variable slope.

7. The multi-phase switching regulator of claim 1, wherein when it is under a phase-add operation, the ramp signal setting circuit causes the ramp signal of the phase to be enabled to gradually change, such that a duty ratio of the PWM signal of the phase to be enabled gradually increases.

8. The multi-phase switching regulator of claim 7, wherein under a phase-add operation in which two or more phases are added, the ramp signal corresponding to one phase to be enabled is first caused to gradually change, and thereafter, the ramp signal corresponding to another phase to be enabled is caused to gradually change.

9. The multi-phase switching regulator of claim 1, wherein when it is under a phase-add operation, in at least one of the power stages that is already active, a basis level of the ramp signal remains unchanged or is caused to gradually increase with a constant or variable slope.

10. The multi-phase switching regulator of claim 1, wherein a slope of a basis level of the ramp signal corresponding to the phase to be disabled is adjustable.

11. The multi-phase switching regulator of claim 7, wherein a slope of a basis level of the ramp signal corresponding to the phase to be enabled is adjustable.

12. A control circuit of a multi-phase switching regulator, the multi-phase switching regulator comprising: a plurality of power stages configured to operably convert an input voltage to an output voltage, wherein each power stage is one phase; wherein at least one of the power stages is configured to be enabled (phase-add) or disabled (phase-cut) according to a phase adjustment signal; and, wherein each power stage controls at least one power transistor in the corresponding power stage according to a corresponding pulse width modulation (PWM) signal, so that the plurality of power stages together convert the input voltage to the output voltage, while each phase generates a respective phase output current; the control circuit comprising:
   a plurality of PWM controllers, which are configured to operably generate the PWM signals for controlling the corresponding power stages according to an error signal which is related to an output voltage and a plurality of ramp signals corresponding to the plurality of PWM controller; and
   a ramp signal setting circuit, which is configured to operably adjust the ramp signal of the phase that is to be enabled or disabled according to the phase adjustment signal; wherein, under a phase-cut operation, the ramp signal setting circuit causes the ramp signal of the phase to be disabled to gradually change, such that a duty ratio of the PWM signal of the phase to be disabled gradually decreases.

13. The control circuit of a multi-phase switching regulator of claim 12, wherein under a phase-cut operation in which two or more phases are cut, the phases to be disabled are turned OFF sequentially and are not turned OFF at the same time.

14. The control circuit of a multi-phase switching regulator of claim 13, wherein under a phase-cut operation in which two or more phases are cut, the ramp signal corresponding to one phase to be disabled is first caused to gradually change, and thereafter, the ramp signal corresponding to another phase to be disabled is caused to gradually change.

15. The control circuit of a multi-phase switching regulator of claim 12, wherein the ramp signal setting circuit includes:

an adjustable offset voltage source, which is configured to operably adjust an offset thereof according to the phase adjustment signal; and an adder circuit, which is configured to add the offset onto an initial ramp signal corresponding to the phase to be enabled or disabled, so as to generate the ramp signal corresponding to the phase to be enabled or disabled, whereby a basis level of the ramp signal is changed.

16. The control circuit of a multi-phase switching regulator of claim 15, wherein the initial ramp signal corresponding to each phase is generated based upon a clock circuit or the corresponding phase output current.

17. The control circuit of a multi-phase switching regulator of claim 12, wherein when it is under a phase-cut operation, in at least one of the power stages that is not to be disabled, a basis level of the ramp signal remains unchanged or is caused to gradually decrease with a constant or variable slope.

18. The control circuit of a multi-phase switching regulator of claim 12, wherein when it is under a phase-add operation, the ramp signal setting circuit causes the ramp signal of the phase to be enabled to gradually change, such that a duty ratio of the PWM signal of the phase to be enabled gradually increases.

19. The control circuit of a multi-phase switching regulator of claim 18, wherein under a phase-add operation in which two or more phases are added, the ramp signal corresponding to one phase to be enabled is first caused to gradually change, and thereafter, the ramp signal corresponding to another phase to be enabled is caused to gradually change.

20. The control circuit of a multi-phase switching regulator of claim 12, wherein when it is under a phase-add operation, in at least one of the power stages that is already active, a basis level of the ramp signal remains unchanged or is caused to gradually increase with a constant or variable slope.

21. The control circuit of a multi-phase switching regulator of claim 12, wherein a slope of a basis level of the ramp signal corresponding to the phase to be disabled is adjustable.

22. The control circuit of a multi-phase switching regulator of claim 18, wherein a slope of a basis level of the ramp signal corresponding to the phase to be enabled is adjustable.

23. A control method of a multi-phase switching regulator, wherein the multi-phase switching regulator comprises: a plurality of power stages configured to operably convert an input voltage to an output voltage, wherein each power stage is one phase; wherein at least one of the power stages is configured to be enabled (phase-add) or disabled (phase-cut) according to a phase adjustment signal; and, wherein each power stage controls at least one power transistor in the corresponding power stage according to a corresponding pulse width modulation (PWM) signal, so that the plurality of power stages together convert the input voltage to the output voltage, while each phase generates a respective phase output current; the control method comprising:

generating the PWM signals according to an error signal which is related to an output voltage and a plurality of ramp signals corresponding to the plurality of power stages respectively; and adjusting the ramp signal of the phase that is to be enabled or disabled according to the phase adjustment signal; wherein, under a phase-cut operation, the ramp signal of the phase to be disabled is caused to gradually change, such that a duty ratio of the PWM signal of the phase to be disabled gradually decreases.

24. The control method of the multi-phase switching regulator of claim 23, wherein under a phase-cut operation in which two or more phases are cut, the phases to be disabled are turned OFF sequentially and are not turned OFF at the same time.

25. The control method of the multi-phase switching regulator of claim 24, wherein under a phase-cut operation in which two or more phases are cut, the ramp signal corresponding to one phase to be disabled is first caused to gradually change, and thereafter, the ramp signal corresponding to another phase to be disabled is caused to gradually change.

26. The control method of the multi-phase switching regulator of claim 23, further comprising:

adjusting an offset according to the phase adjustment signal; and adding the offset onto an initial ramp signal corresponding to the phase to be enabled or disabled, so as to generate the ramp signal corresponding to the phase to be enabled or disabled, whereby a basis level of the ramp signal is changed.

27. The control method of the multi-phase switching regulator of claim 26, wherein the initial ramp signal corresponding to each phase is generated based upon a clock circuit or the corresponding phase output current.

28. The control method of the multi-phase switching regulator of claim 23, wherein when it is under a phase-cut operation, in at least one of the power stages that is not to be disabled, a basis level of the ramp signal remains unchanged or is caused to gradually decrease with a constant or variable slope.

29. The control method of the multi-phase switching regulator of claim 23, wherein when it is under a phase-add operation, the ramp signal of the phase to be enabled is caused to gradually change, such that a duty ratio of the PWM signal of the phase to be enabled gradually increases.

30. The control method of the multi-phase switching regulator of claim 29, wherein under a phase-add operation in which two or more phases are added, the ramp signal corresponding to one phase to be enabled is first caused to gradually change, and thereafter, the ramp signal corresponding to another phase to be enabled is caused to gradually change.

31. The control method of the multi-phase switching regulator of claim 23, wherein when it is under a phase-add operation, in at least one of the power stages that is already active, a basis level of the ramp signal remains unchanged or is caused to gradually increase with a constant or variable slope.

32. The control method of the multi-phase switching regulator of claim 23, wherein a slope of a basis level of the ramp signal corresponding to the phase to be disabled is adjustable.

33. The control method of the multi-phase switching regulator of claim 29, wherein a slope of a basis level of the ramp signal corresponding to the phase to be enabled is adjustable.

* * * * *